(12) United States Patent
Muller

(10) Patent No.: US 8,689,133 B2
(45) Date of Patent: Apr. 1, 2014

(54) MANAGING A CATALOG DISPLAY IN AN E-COMMERCE SYSTEM

(75) Inventor: Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 1390 days.

(21) Appl. No.: 11/320,055

(22) Filed: Dec. 28, 2005

(65) Prior Publication Data

US 2007/0150376 A1 Jun. 28, 2007

(51) Int. Cl.
*G06F 3/00* (2006.01)

(52) U.S. Cl.
USPC ........... 715/788; 715/751; 715/764; 715/778; 715/779; 705/27

(58) Field of Classification Search
USPC ........... 715/764, 781, 788; 705/26, 27; 707/3, 707/102
See application file for complete search history.

(56) References Cited

U.S. PATENT DOCUMENTS

| | | | |
|---|---|---|---|
| 6,629,079 B1 | 9/2003 | Spiegel et al. | |
| 6,907,424 B1 * | 6/2005 | Neal et al. | 707/706 |
| 7,756,750 B2 * | 7/2010 | Venkiteswaran | 705/26.41 |
| 8,214,272 B2 * | 7/2012 | Glassman et al. | 705/35 |
| 2002/0152136 A1 | 10/2002 | Hill | |
| 2002/0165799 A1 | 11/2002 | Jaffe et al. | |
| 2003/0110100 A1 | 6/2003 | Wirth, Jr. | |
| 2003/0172003 A1 | 9/2003 | Holbrook et al. | |
| 2005/0049938 A1 * | 3/2005 | Venkiteswaran | 705/27 |
| 2007/0083442 A1 * | 4/2007 | Peters et al. | 705/27 |
| 2007/0150370 A1 * | 6/2007 | Staib et al. | 705/26 |
| 2008/0281899 A1 * | 11/2008 | Chan et al. | 709/201 |

* cited by examiner

*Primary Examiner* — Amy Ng
*Assistant Examiner* — Meseker Takele
(74) *Attorney, Agent, or Firm* — Steven Greenberg, Esq.; CRGO Law

(57) ABSTRACT

Embodiments of the present invention provide a method, system and computer program product for managing a catalog display in an e-commerce system. In an embodiment, an e-commerce data processing system can include a catalog sub-system and catalog display management logic. The catalog display management logic can include program code enabled to select between displaying an active mode view and a passive mode view for catalog items in a catalog. In this regard, the active mode can include a catalog display, a subset of catalog items rendered in a static view in the catalog display, and at least one detailed view of detailed information in the catalog display for a selected one of the catalog items in the static view. Likewise, the passive mode view can include a catalog display, a subset of catalog items rendered in a static view in the catalog display, and at least one detailed view of changing detailed information in the catalog display for cycled ones of the catalog items in the static view.

18 Claims, 2 Drawing Sheets

US 8,689,133 B2

MANAGING A CATALOG DISPLAY IN AN E-COMMERCE SYSTEM

BACKGROUND OF THE INVENTION

1. Field of the Invention

The present invention relates to the field of e-commerce and more particularly to a catalog display for an e-commerce system.

2. Description of the Related Art

E-commerce systems have evolved to provide virtual storefronts whose operational capabilities far exceed those of the traditional, brick and mortar store. Whereas in the brick and mortar store, each of the sales, marketing, order fulfillment, inventory, and customer service functions remain the separate responsibilities of corresponding business roles, in a well-defined e-commerce system, each of the sales, marketing, order fulfillment, inventory and customer service can be integrated in a single computing system in a highly automated fashion. Consequently, a more optimal business operation can result in which data flows between different functional subsystems seamlessly to facilitate the daily conduct of business managed by the e-commerce system.

In the prototypical e-commerce system, an on-line catalog of available goods and/or services for sale can be established along with associated pricing. Customers can be provided with a store front user interface through which customers can browse the on-line catalog. When a customer desires to purchase a product or service, the customer can so indicate causing the addition of the selected product or service to an on-line shopping cart, though it is also known to bypass the shopping cart model in favor of direct purchase model.

Generally, the catalog sub-system for an e-commerce site can provide a searchable selection of items for viewing by consumers. Consumers can navigate the catalog serially, by category, or search term in order to filter offered items to a manageable sub-set. Once a sub-set of items has been produced, a consumer can view an image of an item or other such product detail by selecting a link to the product within the sub-set. The consumer can view additional products from the sub-set by returning to the view of the sub-set and selecting a different link to a different product.

Oftentimes, consumers prefer to select a product or service for purchase through an iterative compare and contrast process between different offered items. To facilitate the comparison by the consumer of different product or service offering, a compare view can be provided in which different selected ones of the items in the sub-set are presented side by side on a feature by feature basis. In this way, consumers can visually identify differences among items in the sub-set. Notwithstanding, in many cases, end users prefer to browse different products without engaging in a tedious compare process. Yet, the single product view afforded by conventional catalog subsystems permits only a view of one product or service at a time.

At least one commercially available catalog sub-system provides for a composite view of a single product in relation to a streaming view of a sub-set of products. Specifically, it is known to stream a pictorial listing of product offerings in a tickertape fashion across the bottom of a display. The selection of one of the products in the streaming listing can result in the rendering of detailed product information within the same display. Notwithstanding, the display of detailed product information is limited to a single selected product in the streaming listing and a compare view is not possible. Moreover, the dynamic, streaming nature of the product listing can be distracting and clumsy for consumers seeking to browse product offerings at a varying pace.

At least one other commercial offering provides for a composite view of a product in respect to a fixed display of a product listing. In the latter circumstance, a static display of pictorial references to product offerings can be provided. The selection of one of the products in the static display can result in a magnified view of the pictorial reference to the selected product in the same display. Nevertheless, the magnified view differs from the view in the static display only in size and not content. Consequently, a different view of the product providing enhanced product information is lacking for the foregoing composite view.

BRIEF SUMMARY OF THE INVENTION

Embodiments of the present invention address deficiencies of the art in respect to catalog management and provide a novel and non-obvious method, system and computer program product for managing a catalog display in an e-commerce system. In one embodiment of the invention, a catalog display method can include rendering a subset of catalog items for a catalog in a static view in a catalog display, and further rendering in the catalog display a detailed view of detailed information for a selected one of the catalog items in the static view. For instance, rendering a subset of catalog items for a catalog in a static view in a catalog display can include rendering a subset of catalog items for a catalog in a static view about a periphery of a catalog display.

In one aspect of the embodiment, further rendering in the catalog display a detailed view of detailed information for a selected one of the catalog items in the static view, can include further rendering in the catalog display multiple detailed views, each of the detailed views including detailed information for a corresponding selected one of the catalog items in the static view. Additionally, the method can include yet further rendering in the catalog display a compare view for selected elements of the detailed information across the detailed views. Optionally, further rendering the detailed view of detailed information for a selected one of the catalog items in the static view can include further rendering within the periphery of the catalog display a detailed view of detailed information for a selected one of the catalog items in the static view.

In another embodiment of the invention an e-commerce data processing system can be provided. The e-commerce data processing system can include a catalog sub-system and catalog display management logic. The catalog display management logic can include program code enabled to select between displaying an active mode view and a passive mode view for catalog items in a catalog. In this regard, the active mode can include a catalog display, a subset of catalog items rendered in a static view in the catalog display, and at least one detailed view of detailed information in the catalog display for a selected one of the catalog items in the static view. Likewise, the passive mode view can include a catalog display, a subset of catalog items rendered in a static view in the catalog display, and at least one detailed view of changing detailed information in the catalog display for cycled ones of the catalog items in the static view.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for managing a catalog display in an e-commerce system. In accordance with an embodiment of the present invention, a composite display can be provided to include both a static subset of catalog items in summary form and also a detailed view of one or more selected items in the subset. The static subset of catalog items can be rendered at the periphery of the composite display while the detailed view of the items can be rendered within the periphery. Notably, in an idle mode, the detailed view can cycle through unselected, different ones of the items in the subset. In this way, end users can be visually stimulated to interact with the composite display, albeit the end users needn't become distracted by a dynamic display in an active mode.

Figure 1A:
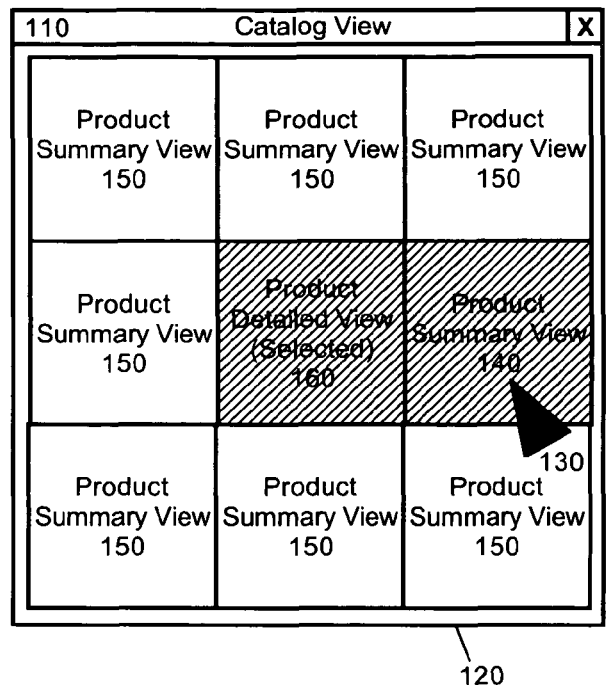
FIG. 1A is a pictorial illustration of an active mode view of a catalog display arranged according to a first embodiment of the present invention.

In further illustration, FIG. 1A is a pictorial illustration of an active mode view of a catalog display arranged according to a first embodiment of the present invention. In accordance with the first embodiment, a catalog view 110 can include a catalog item display 120. The catalog item display 120 can be a static view of catalog items 150 and a separate detailed view of catalog items 160. The static view of catalog items 150 can include a summary rendering of a number of catalog items in a catalog. This static view of catalog items may have been pre-specified by the provider to include a pre-selected set of catalog items, may have been calculated to include a dynamically selected set of catalog items in response to a user's search request, or may have been produced to include a predictive set of catalog items presumed to be of greatest interest to the user. The separate detailed view of catalog items 160, in turn, can include a rendering of detailed information for one or more selected ones 140 of the catalog items in the static view of catalog items 150. As it will be apparent to the skilled artisan, however, a rendering of detailed information for only a single selected catalog item 140 in the static view of catalog items is shown for the sake of illustrative simplicity.

In one aspect of the embodiment shown in FIG. 1A, the static view of catalog items 150 can be placed about the periphery of the catalog item display 120. Within a display region defined by the static view of catalog items 150, the detailed view of catalog items 160 can be rendered. In this regard, the catalog item display 120 can be pre-configured to render a number of selected catalog items 140 in the detailed view of the catalog items 160. As individual catalog items in the static view of catalog items 150 are selected through selection element 130, the detailed view of the catalog items 160 can be populated with detailed item information for a catalog item associated with the selected catalog item 140 in the static view of catalog items 150.

Optionally, the portion of the detailed view of the catalog items 160 associated with a selected catalog item 140 in the static view of catalog items 150 can be formatted similarly to the selected catalog item 140 in the static view of catalog items 150 so as to establish a visual association between the selected catalog item 140 in the static view of catalog items 150 and the detailed item information for the selected catalog item 140 in the detailed view of the catalog items 160. Other aspects of the embodiment will be recognized by the skilled artisan as will be shown FIG. 1B. Specifically, FIG. 1B is a pictorial illustration of an active mode view of a catalog display arranged according to a second embodiment of the present invention.

Figure 1B:
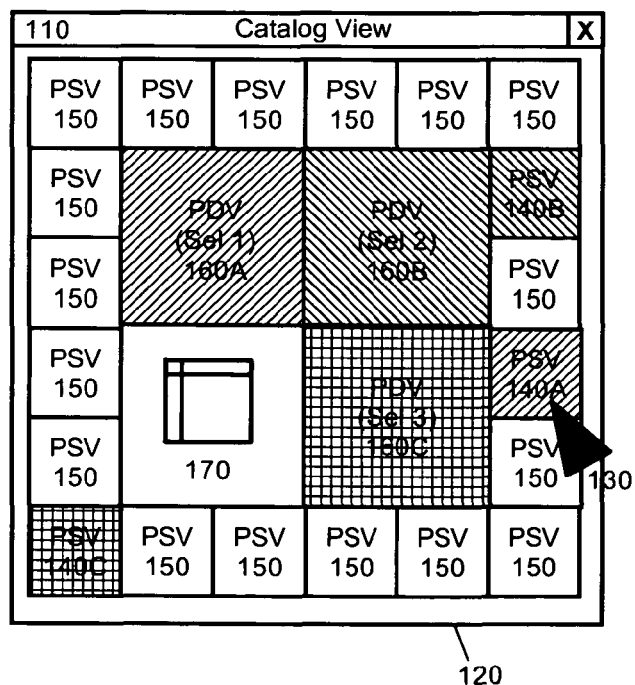
FIG. 1B is a pictorial illustration of an active mode view of a catalog display arranged according to a second embodiment of the present invention.

Turning now to FIG. 1B, as before a number of catalog items can be rendered within the static view of catalog items 150. Likewise, the catalog item display 120 can be pre-configured to render detailed information for a number of selected catalog items 140A, 140B, 140C in respective detailed views of the catalog items 160A, 160B, 160C. To that end, the catalog item display can be partitioned to accommodate detailed views of the catalog items 160A, 160B, 160C for different selected catalog items 140A, 140B, 140C in the static view of the catalog items 150. Also, each of the different detailed views of the catalog items 160A, 160B, 160C can have a visual format matching that of the corresponding selected catalog items 140A, 140B, 140C in the static view of catalog items 150. To the extent that one of the partitions in the catalog item display 120 is not assigned to a selected catalog item in the static view of the catalog items 150, a comparison table 170 can be provided within the unused partition comparing elements of each of the different detailed views of the catalog items 160A, 160B, 160C.

Figure 2:
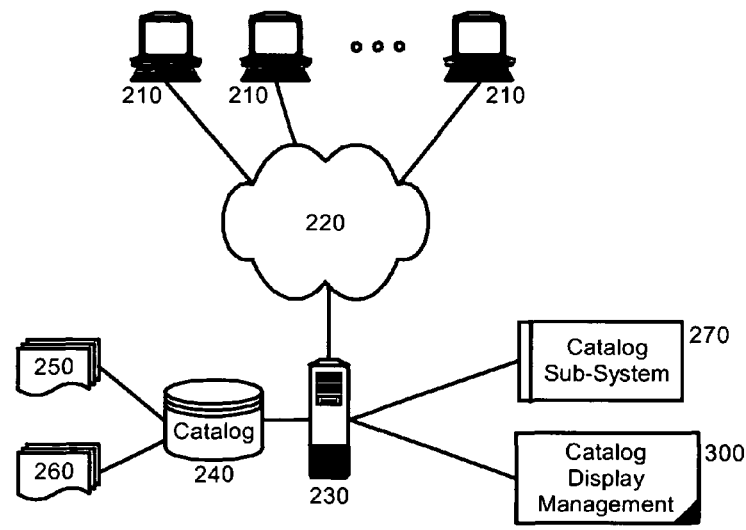
FIG. 2 is a schematic illustration of an e-commerce data processing system configured to support catalog display management in accordance with the present invention; and, FIG. 3 is a flow chart illustrating a process for catalog display management for use in the system of FIG. 2.

The catalog item display 120 of FIGS. 1A and 1B can be provided within an e-commerce data processing system enabled support catalog display management. In more particular illustration, FIG. 2 is a schematic illustration of an e-commerce data processing system configured to support catalog display management in accordance with the present invention. As shown in FIG. 2, an e-commerce data processing system can include an e-commerce host 230 configured with a catalog sub-system 270. The catalog sub-system can be enabled to provide catalog services to the e-commerce host 230 for providing catalog items in a catalog 240 for sale in a catalog view of an e-commerce application to catalog browsing clients 210 over a computer communications network 220.

Notably, the catalog sub-system can be coupled to catalog display management logic 300. The catalog display management logic 300 can include program code enabled to selectively provide active mode views 250 of the catalog 240, and idle mode views 260 of the catalog 240. In the active mode, an end user interacts with the e-commerce host 230 in consequence of which each of the active mode views 250 can include a static view of catalog items disposed about the periphery of the catalog display, and one or more detailed catalog item views within the periphery for corresponding selected catalog items in the static view. In contrast, in the idle mode, an end user does not interact with the e-commerce host 230 in consequence of which each of the idle mode views 260 can provide a static view of catalog items disposed about the periphery of the catalog display, and one or more detailed catalog item views within the periphery for cycled ones of the catalog items in the static view.

Figure 3:
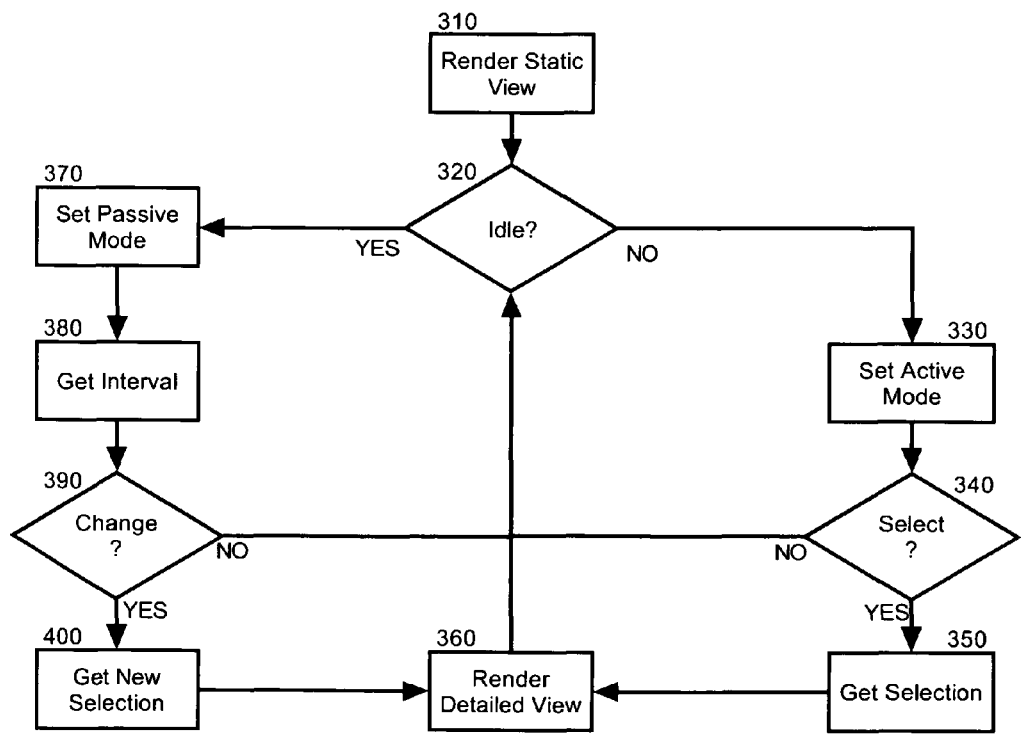

In yet further illustration, FIG. 3 is a flow chart illustrating a process for catalog display management for use in the system of FIG. 2. Beginning in block 310, a static view of items can be rendered in the catalog display. In decision block 320, it can be determined whether the e-commerce host is idle in respect to a particular e-commerce client. If not, in block 330, the active mode can be set and in decision block 340, it can be determined if a catalog item in the static view has been selected. If so, the catalog item associated with the selection can be identified and detailed information can be obtained for the identified catalog item in block 350. Subsequently, in block 360, a detailed view for the detailed information can be rendered in the catalog display along with the static view.

Returning to decision block 320, if it is determined that the e-commerce host is idle in respect to the particular e-commerce client, in block 370, the passive mode can be set and an interval can be determined for cycling different catalog items in the static view. In decision block 390, based upon the interval, it can be determined whether or not to change a detailed view for a cycled one of the catalog items. If so, in block 400 a new catalog item in the static view can be selected for cycling and viewing in a detailed view in the catalog display. Finally, in block 360, a detailed view can be rendered in the catalog display with detailed information for the cycled one of the catalog items in the catalog view.

In consequence of the present invention, a viewer can view both a subset of catalog items and a detailed view of one or more selected ones of the catalog items in the subset concurrently without requiring tediously frequent display changes. Additionally, a compare view further can be provided in addition to the static view of the subset of catalog items and any detailed views for selected catalog items in the subset. Finally, to encourage viewer interaction with the catalog display, a dynamic cycling of detailed views for detailed information for different catalog items in the static view can be provided to draw the viewer into interacting with the catalog display.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer storage readable medium can be any apparatus that can contain, store, communicate, or transport the program for use by or in connection with the instruction execution system, apparatus, or device. The storage medium can be an electronic, magnetic, optical, electromagnetic, infrared, or semiconductor system (or apparatus or device). Examples of a computer-readable (usage) storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. With specific reference to a computer usable (readable) storage medium, it is to be understood that a storage medium excludes transitory media such as transitory signals and other propagation media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A catalog display method comprising:
configuring an e-commerce host with a catalog sub-system providing access to catalog items in a catalog in a catalog view of an e-commerce application to catalog browsing clients over a computer communications network, the catalog view being a singular user interface and including a catalog item display comprising a static view of catalog items and a separate detailed view of catalog items;
loading a subset of the catalog items of the catalog;
rendering the subset of the catalog items in the static view of the catalog item display;
further rendering in the catalog item display a detailed view of detailed information for a selected one of the subset of the catalog items in the static view of the catalog item display; and,
responsive to detecting idleness for a catalog browsing client, setting a passive mode, determining an interval, and automatically cycling through different catalog items in the static view of the catalog item display based upon the interval causing a repeated rendering of the detailed view, each rendering reflecting detailed information for the different catalog items.

2. The method of claim 1, wherein rendering the subset of the catalog items in the static view in the catalog item display, comprises rendering the subset of the catalog items for the catalog in the static view about a periphery of the catalog item display.

3. The method of claim 2, wherein further rendering in the catalog item display the detailed view of detailed information for the selected one of the subset of the catalog items in the static view of the catalog item display, comprises further rendering within the periphery of the catalog item display a detailed view of detailed information for a selected one of the subset of the catalog items in the static view of the catalog item display.

4. The method of claim 1, wherein further rendering in the catalog item display the detailed view of detailed information for the selected one of the subset of the catalog items in the static view of the catalog item display, comprises further rendering in the catalog display a plurality of detailed views, each of the detailed views comprising detailed information for a corresponding selected one of the subset of the catalog items in the static view of the catalog item display.

5. The method of claim 4, further comprising, yet further rendering in the catalog item display a compare view for selected elements of the detailed information across the detailed views.

6. The method of claim 1, further comprising visually formatting in a similar visual format each of the selected one of the subset of the catalog items in the static view of the catalog item display, and the detailed view of detailed information for the selected one of the subset of the catalog items in the static view of the catalog item display.

7. An e-commerce data processing system comprising:
a catalog sub-system executing in memory of a computer; and,
catalog display management logic executing in memory of the computer, the catalog display management logic comprising program code enabled to select between displaying an active mode view and a passive mode view for catalog items in a catalog, to load a subset of catalog items of the catalog, to render the subset of catalog items in a static view of a catalog item display, to further render in the catalog item display a detailed view of detailed information for a selected one of the subset of catalog items in the static view of the catalog item display, to set a passive mode responsive to detecting idleness for a catalog browsing client, to determine an interval, and also to automatically cycle through different catalog items in the static view of the catalog item displayed based upon the interval causing a repeated rendering of the detailed view, each rendering reflecting detailed information for the different catalog items.

8. The system of claim 7, wherein the active mode view comprises:
the catalog item display;
the subset of catalog items rendered in the static view in the catalog item display; and,
at least one detailed view of detailed information in the catalog item display for the selected one of the subset of catalog items in the static view.

9. The system of claim 8, wherein the selected one of the subset of catalog items in the static view of the catalog item display and the corresponding detailed view in the catalog item display comprises a similar visual formatting.

10. The system of claim 7, wherein the passive mode view comprises:
the catalog item display;
the subset of catalog items rendered in the static view in the catalog item display; and,
at least one detailed view of changing detailed information in the catalog item display for cycled ones of the catalog items in the static view.

11. The system of claim 7, further comprising a compare view for elements of detailed information of different selected ones of the catalog items in the catalog.

12. The system of claim 7, wherein the subset of catalog items rendered in the static view of the catalog item display comprises a subset selected from the group consisting of a pre-selected subset of catalog items, a dynamically selected subset of catalog items responsive to a search request, and a predictive subset of catalog items indicative of a predicted user preference of catalog items of interest.

13. A computer program product comprising a computer usable storage medium having computer usable program code for catalog display, said computer program product including:
computer usable program code for loading a subset of catalog items of a catalog;
computer usable program code for rendering the subset of catalog items for the catalog in a static view in a catalog item display; and,
computer usable program code for further rendering in the catalog item display a detailed view of detailed information for a selected one of the catalog items in the static view of the catalog item display; and,
computer usable program code for setting a passive mode responsive to detecting idleness for a catalog browsing client, determining an interval, and automatically cycling through different catalog items in the static view of the catalog item display based upon the interval causing a repeated rendering of the detailed view, each rendering reflecting detailed information for the different catalog items.

14. The computer program product of claim 13, wherein the computer usable program code for rendering the subset of catalog items for the catalog in the static view in the catalog item display, comprises computer usable program code for rendering the subset of catalog items for the catalog in the static view about a periphery of the catalog item display.

15. The computer program product of claim 14, wherein the computer usable program code for further rendering in the catalog item display the detailed view of detailed information for the selected one of the subset of catalog items in the static view of the catalog item display, comprises computer usable program code for further rendering within the periphery of the catalog item display a detailed view of detailed information for a selected one of the catalog items in the static view of the catalog item display.

16. The computer program product of claim 13, wherein the computer usable program code for further rendering in the catalog item display the detailed view of detailed information for the selected one of the catalog items in the static view of the catalog item display, comprises computer usable program code for further rendering in the catalog display a plurality of detailed views, each of the detailed views comprising detailed information for a corresponding selected one of the catalog items in the static view of the catalog item display.

17. The computer program product of claim 16, further comprising, computer usable program code for yet further rendering in the catalog item display a compare view for selected elements of the detailed information across the detailed views.

18. The computer program product of claim 13, further comprising computer usable program code for visually formatting in a similar visual format each of the selected one of the subset of catalog items in the static view of the catalog item display, and the detailed view of detailed information for the selected one of the subset of catalog items in the static view of the catalog item display.

* * * * *